United States Patent
Nihei et al.

(10) Patent No.: US 12,066,071 B2
(45) Date of Patent: Aug. 20, 2024

(54) SINTERED FRICTION MATERIAL AND METHOD FOR PRODUCING SINTERED FRICTION MATERIAL

(71) Applicant: AKEBONO BRAKE INDUSTRY CO., LTD., Tokyo (JP)

(72) Inventors: Marina Nihei, Tokyo (JP); Hideaki Takahashi, Tokyo (JP); Masanori Kato, Tokyo (JP); Katsuhiro Onodera, Tokyo (JP); Atsushi Ueno, Tokyo (JP); Eri Takada, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 170 days.

(21) Appl. No.: 17/290,152

(22) PCT Filed: Oct. 28, 2019

(86) PCT No.: PCT/JP2019/042148
§ 371 (c)(1),
(2) Date: Apr. 29, 2021

(87) PCT Pub. No.: WO2020/090725
PCT Pub. Date: May 7, 2020

(65) Prior Publication Data
US 2022/0003290 A1    Jan. 6, 2022

(30) Foreign Application Priority Data

Oct. 31, 2018 (JP) .................. 2018-205687
Sep. 25, 2019 (JP) .................. 2019-174044

(51) Int. Cl.
*F16D 69/00* (2006.01)
*C04B 35/462* (2006.01)
*F16D 49/00* (2006.01)
*F16D 69/02* (2006.01)

(52) U.S. Cl.
CPC .......... *F16D 69/027* (2013.01); *C04B 35/462* (2013.01); *F16D 49/00* (2013.01); *C04B 2235/3234* (2013.01); *C04B 2235/404* (2013.01); *C04B 2235/602* (2013.01); *C04B 2235/65* (2013.01); *F16D 2200/0026* (2013.01); *F16D 2200/0043* (2013.01); *F16D 2200/0082* (2013.01)

(58) Field of Classification Search
CPC ............ F16D 49/00; F16D 69/027; F16D 2200/0026; F16D 2200/0043; F16D 2200/0082; F16D 69/028; F16D 2200/0047; C04B 35/462; C04B 2235/3234; C04B 2235/404; C04B 2235/602; C04B 2235/65; C04B 35/465; C04B 35/62625; C04B 35/645; C04B 2235/3258; C04B 2235/604; C04B 2235/725; C04B 2235/327; B22F 2998/00; B22F 2999/00; B22F 2998/10; B22F 1/105; B22F 3/02; B22F 3/14; C22C 29/00; C22C 49/02; C22C 49/14; C22C 33/0228

See application file for complete search history.

(56) References Cited

U.S. PATENT DOCUMENTS

| | | |
|---|---|---|
| 5,780,170 A | 7/1998 | Gonia et al. |
| 6,004,370 A | 12/1999 | Takemoto et al. |
| 6,051,277 A | 4/2000 | Claussen et al. |
| 2003/0026969 A1 | 2/2003 | Nagata et al. |
| 2014/0342899 A1 | 11/2014 | Itami et al. |
| 2015/0369320 A1 | 12/2015 | Onda et al. |
| 2016/0221882 A1 | 8/2016 | Muroya et al. |
| 2016/0312846 A1* | 10/2016 | Miyaji .................. F16D 69/026 |
| 2017/0363167 A1 | 12/2017 | Csanadi et al. |
| 2020/0158200 A1 | 5/2020 | Takahashi et al. |

FOREIGN PATENT DOCUMENTS

| | | | |
|---|---|---|---|
| CN | 1138879 A | 12/1996 | |
| CN | 103797085 A * | 5/2014 | ........... F16D 69/026 |
| CN | 104884562 A | 9/2015 | |
| CN | 105555900 A | 5/2016 | |
| CN | 106084644 A | 11/2016 | |

(Continued)

OTHER PUBLICATIONS

The Extended European Search Report issued Jun. 8, 2022 in European Patent Application No. 19880083.1.

(Continued)

*Primary Examiner* — Taiwo Oladapo
(74) *Attorney, Agent, or Firm* — Faegre Drinker Biddle & Reath LLP

(57) ABSTRACT

A sintered friction material, in which a content of a copper component is 0.5 mass % or less, is provided. The sintered friction material includes a titanate and a metal material other than copper, as a matrix. A content of the metal material other than copper is 10.0 volume % to 34.0 volume %. A method for manufacturing a sintered friction material is provided. The method includes a mixing step of mixing raw materials containing a titanate and a metal material other than copper, a molding step of molding the raw materials mixed in the mixing step, and a sintering step of sintering, at 900° C. to 1300° C., a molded product molded in the molding step. In the sintered friction material, the titanate and the metal material other than copper form a matrix, and a content of the metal material other than copper is 10.0 volume % to 34.0 volume %.

13 Claims, No Drawings

(56) References Cited

FOREIGN PATENT DOCUMENTS

| CN | 106085356 A | | 11/2016 | |
|---|---|---|---|---|
| CN | 107523716 A | | 12/2017 | |
| CN | 110832049 A | | 2/2020 | |
| JP | H11-080855 A | | 3/1999 | |
| JP | 2006-347379 A | | 12/2006 | |
| JP | 2006-348379 A | | 12/2006 | |
| JP | 2008-214727 A | | 9/2008 | |
| JP | 2009073908 A | * | 4/2009 | |
| JP | 2017-002185 A | | 1/2017 | |
| JP | 6061592 B2 | | 1/2017 | |
| JP | 2017-057312 A | | 3/2017 | |
| WO | WO-2013054857 A1 | * | 4/2013 | ........... F16D 69/027 |

OTHER PUBLICATIONS

First Office Action issued Dec. 9, 2021 in Chinese Patent Application No. 201980072171.6 (9 pages) with an English translation (10 pages).
English translation of the Written Opinion mailed Dec. 10, 2019 in International Application No. PCT/JP2019/042148.
International Search Report mailed Oct. 12, 2019 for PCT/JP2019/042148.
Written Opinion mailed Oct. 12, 2019 for PCT/JP2019/042148.

* cited by examiner

SINTERED FRICTION MATERIAL AND METHOD FOR PRODUCING SINTERED FRICTION MATERIAL

TECHNICAL FIELD

The present invention relates to a sintered friction material and a method for manufacturing a sintered friction material.

BACKGROUND ART

In recent years, it has been noted that a friction material containing a copper component contains the copper component in an abrasion powder generated during braking, which may cause river, lake, or marine contamination. Therefore, a motion of limiting the use of the friction material containing a copper component is rising, and a friction material excellent in friction action even containing a few amount of copper component is required.

For example, in Patent Literature 1, the applicant proposes a friction material containing ceramics as a matrix and containing a carbon material.

CITATION LIST

Patent Literature

Patent Literature 1: Japanese Patent No. 6061592

SUMMARY OF INVENTION

Technical Problem

However, in the sintered friction material described in Patent Literature 1, a friction test has been conducted at an initial speed of 50 km/h, but evaluation in a higher speed range has not been examined.

The present invention has been made in view of the above circumstances in the related art, and an object of the present invention is to provide a sintered friction material containing a copper component in a content of a certain amount or less as an environmentally friendly friction material, and having sufficient friction performance in a high speed range.

Solution to Problem

As a result of intensive studies, the present inventors have invented that a metal material other than copper and a titanate are used as a matrix in a sintered friction material to solve the above problems. Thus, the present invention has been completed.

That is, the present invention relates to the following <1> to <6>.

<1> A sintered friction material, in which a content of a copper component is 0.5 mass % or less, containing:

a titanate and a metal material other than copper, as a matrix, wherein a content of the metal material other than copper is 10.0 volume % to 34.0 volume %.

<2> The sintered friction material according to <1>, wherein the titanate contains at least one salt selected from a group consisting of an alkali metal titanate, an alkaline earth metal titanate, and a titanate complex.

<3> The sintered friction material according to <1> or <2>, wherein the titanate contains at least one salt selected from a group consisting of potassium titanate, sodium titanate, calcium titanate, lithium potassium titanate, and potassium magnesium titanate.

<4> The sintered friction material according to any one of <1> to <3>, wherein the metal material other than copper contains an iron-based material, and a content of the iron-based material is 8.0 volume % to 32.0 volume %.

<5> The sintered friction material according to any one of <1> to <4>, wherein the metal material other than copper further contains tungsten, and a content of tungsten is 1.0 volume % to 15.0 volume %.

<6> A method for manufacturing a sintered friction material, including: a mixing step of mixing raw materials containing a titanate and a metal material other than copper;

a molding step of molding the raw materials mixed in the mixing step; and a sintering step of sintering, at 900° C. to 1300° C., a molded product molded in the molding step, wherein in the sintered friction material, the titanate and the metal material other than copper form a matrix, and a content of the metal material other than copper is 10.0 volume % to 34.0 volume %.

Advantageous Effects of Invention

According to the present invention, it is possible to provide a sintered friction material which is environmentally friendly and has sufficient friction performance even in a high speed range.

DESCRIPTION OF EMBODIMENTS

Hereinafter, the present invention will be described in detail, but these show examples of desirable embodiments, and the present invention is not specified in these contents.

Sintered Friction Material

A sintered friction material of the present invention in which a content of a copper component is 0.5 mass % or less, contains a titanate and a metal material other than copper as a matrix, in which a content of the metal material other than copper is 10.0 volume % to 34.0 volume %.

Matrix

In the present invention, the term "matrix" means one to be the main skeleton of the friction material.

Metal Material Other Than Copper

The sintered friction material of the present invention contains 10.0 volume % to 34.0 volume % of a metal material other than copper (hereinafter, may be simply referred to as "metal material") as a matrix.

When the content of the metal material in the sintered friction material of the present invention is less than 10.0 volume %, an adhesive force between the metal materials between the sintered friction material and a mating material of the sintered friction material becomes small, and there is a possibility that a sufficient adhesive friction force cannot be obtained. Therefore, when the content of the metal material is less than 10.0 volume %, the sintered friction material of the present invention may not be given a sufficient friction coefficient μ in a high speed range.

The content of the metal material is preferably 12.5 volume % or more, and more preferably 14.0 volume % or more, from the viewpoint of improving friction performance.

When the content of the metal material is larger than 34.0 volume %, the amount of the metal material transferred to the mating material of the sintered friction material may increase. When the amount of the metal material transferred increases, strength of the sintered friction material of the present invention may decreases, and abrasion resistance may decrease.

The content of the metal material is preferably 32.0 volume % or less, and more preferably 30.0 volume % or less, from the viewpoint of improving abrasion resistance.

Examples of the metal material include an iron-based material, tungsten, tin, a tin alloy, titanium, aluminum, silicon, zinc, a Fe-Al intermetallic compound, and the like. These metal materials can be used alone or in combination of two or more thereof.

Among these metal materials, an iron-based material, tungsten and tin are preferred from the viewpoint of improving the friction performance of the sintered friction material.

When the metal material contains an iron-based material, a content of the iron-based material in the sintered friction material of the present invention is preferably 8.0 volume % to 32.0 volume %, more preferably 10.5 volume % to 30.0 volume %, and still more preferably 12.0 volume % to 30.0 volume %.

When the content of the iron-based material is 8.0 volume % or more, the friction performance of the sintered friction material of the present invention can be further improved. When the content of the iron-based material is 32.0 volume % or less, it is possible to prevent a decrease in abrasion resistance due to the transfer of the iron-based material to the mating material of the sintered friction material.

Examples of the iron-based material include iron, an alloy containing iron such as steel and stainless steel, and the like. These iron-based materials can be used alone or in combination of two or more thereof.

When the metal material contains tungsten, a content of tungsten in the sintered friction material of the present invention is preferably 1.0 volume % to 15.0 volume %, more preferably 2.0 volume % to 13.0 volume %, and still more preferably 3.0 volume % to 11.0 volume %.

When the content of tungsten is 1.0 volume % or more, the abrasion resistance of the sintered friction material of the present invention can be improved. When the content of tungsten is 15.0 volume % or less, the strength of the sintered friction material of the present invention can be ensured.

When the metal material contains tin, a content of tin in the sintered friction material of the present invention is preferably 5.0 volume % or less, more preferably 4.0 volume % or less, and still more preferably 3.0 volume % or less.

When the content of tin is more than 5.0 volume %, the homogeneity of the sintered friction material of the present invention may decrease.

Moreover, as a form of the metal material, for example, a powder form, a fibrous form and the like can be mentioned.

Titanate

The sintered friction material of the present invention contains a titanate as a matrix. The titanate is a compound having high abrasion resistance and the like, and contributes to improving the abrasion resistance and the like of the sintered friction material.

For example, when the friction material using a resin as a matrix contains a titanate as a filler, a heating temperature in manufacturing the friction material is low. Therefore, in the case of a friction material using a resin as a matrix, the titanate stays in the friction material in an original shape thereof when mixed as a filler. On the other hand, in the sintered friction material of the present invention, the titanate is in a sintered state and forms a matrix.

The titanate contained as a filler in the friction material and the titanate contained as a matrix in the sintered friction material can be clearly distinguished by SEM (scanning electron microscope) observation or the like.

A content of the titanate in the sintered friction material of the present invention is preferably 8.0 volume % or more, more preferably 10.0 volume % or more, and still more preferably 12.0 volume % or more.

When the content of titanate is 8.0 volume % or more, in molding and sintering raw materials including the titanate, the titanate can be sintered to form a matrix of the friction material.

The content of the titanate is preferably 60.0 volume % or less, more preferably 58.0 volume % or less, and still more preferably 55.0 volume % or less.

When the content of the titanate is 60.0 volume % or less, a component necessary as a friction material such as an abrasive and a lubricant can be sufficiently contained.

In addition, the titanate has a density lower than that of a metal such as iron. Therefore, the sintered friction material of the present invention has a lower density and is lighter than an iron-based sintered friction material containing only a metal such as iron as a matrix.

Examples of the titanate include: alkali metal titanate such as potassium titanate, lithium titanate, and sodium titanate; alkaline earth metal titanate such as calcium titanate, barium titanate, and magnesium titanate; and titanate complexes such as lithium potassium titanate and potassium magnesium titanate. These titanate can be used alone or in combination of two or more thereof.

Among these, potassium titanate, sodium titanate, calcium titanate, lithium potassium titanate, and potassium magnesium titanate are preferred from the viewpoints of heat resistance and abrasion resistance.

Further, in consideration of work environment hygiene, a titanate having a shape other than so-called whiskers (fibers) such as a spherical shape, a plate shape, a scale shape, and a columnar shape is preferred.

Abrasive

The sintered friction material of the present invention preferably contains an abrasive. When the abrasive is contained, the sintered friction material of the present invention can be provided with desired friction performance.

A content of the abrasive in the sintered friction material of the present invention is preferably 25.0 volume % or less, more preferably 23.0 volume % or less, and still more preferably 20.0 volume % or less.

When the content of the abrasive is 25.0 volume % or less, aggressiveness against the mating material of the sintered friction material of the present invention can be easily prevented being too high.

Examples of the abrasive include chromium oxide, zirconium oxide, silicon carbide, magnesia, alumina, silica, zirconia, zirconium silicate, triiron tetraoxide ($Fe_3O_4$), chromite, and the like. These abrasives can be used alone or in combination of two or more thereof Among these, chromium oxide, zirconium oxide, silicon carbide, magnesia and alumina are preferred, and chromium oxide, zirconium oxide and silicon carbide are more preferred from the viewpoint of the balance between abradability and the aggressiveness against the mating material.

Lubricant

The sintered friction material of the present invention preferably contains a lubricant. When the lubricant is contained, it is possible to prevent seizure of the sintered friction material of the present invention with the mating material thereof and improve the abrasion resistance of the sintered friction material of the present invention.

A content of the lubricant in the sintered friction material of the present invention is preferably 20.0 volume % to 65.0 volume %, more preferably 30.0 volume % to 65.0 volume %, and still more preferably 35.0 volume % to 65.0 volume % from the viewpoint of abrasion resistance.

Examples of the lubricant include artificial graphite, natural graphite, coke, molybdenum disulfide, tin sulfide, iron sulfide, zinc sulfide, and the like. These lubricants can be used alone or in combination of two or more thereof.

Among these, artificial graphite, natural graphite, and molybdenum disulfide are preferred from the viewpoints of sinterability and abrasion resistance.

Other Components

The sintered friction material of the present invention may contain other components other than the above-mentioned components as long as it contains the above-mentioned various components. Examples of other components include inorganic fillers such as barium sulfate, calcium carbonate, calcium hydroxide, vermiculite, mica, mullite, silicon nitride, and zircon sand. These other components can be used alone or in combination of two or more thereof.

Copper Component

A content of the copper component in the sintered friction material of the present invention is 0.5 mass % or less in terms of copper element from the viewpoint of reducing the environmental load. It is preferable that the sintered friction material of the present invention does not contain a copper component.

Method for Manufacturing Sintered Friction Material

A method for manufacturing a sintered friction material of the present invention includes:
a mixing step of mixing raw materials including a titanate and a metal material other than copper;
a molding step of molding the raw materials mixed in the mixing step; and a sintering step of sintering, at 900° C. to 1300° C., a molded product molded in the molding step, wherein
in the sintered friction material, the titanate and the metal material other than copper and form a matrix, and a content of the metal material other than copper is 10.0 volume % to 34.0 volume %.

A mixing method used in the mixing step is not particularly limited as long as the raw materials are uniformly mixed, and a known method can be used. For example, a method can be used in which an appropriate amount of an organic solvent is added to raw materials as needed, and wet mixing is performed using a rotary mixer or the like to uniformly disperse the raw materials.

Next, a molding step of molding the raw materials mixed in the mixing step is performed.

In the molding step, dry molding methods such as uniaxial pressure molding and CIP molding (cold isostatic molding); plastic molding methods such as injection molding and extrusion molding; casting methods such as slurry casting, pressure casting and rotary casting; tape molding methods such as a doctor blade method; cold press; or the like can be used appropriately. The above molding methods may be used alone or in combination of two or more thereof.

A molding surface pressure in the molding step is preferably 300 MPa to 900 MPa from the viewpoint of moldability.

Next, a sintering step of sintering a molded product molded in the molding step is performed.

In the sintering step, the sintering of the molded product can be performed by a hot press method, an atmosphere sintering method, a reaction sintering method, a normal pressure sintering method, a thermal plasma sintering method, or the like.

A sintering temperature in the sintering step is 900° C. to 1300° C., preferably 900° C. to 1250° C., and more preferably 900° C. to 1200° C. When the sintering temperature is lower than 900° C., the matrix may be fragile. When the sintering temperature is higher than 1300° C., the raw materials may start to melt.

A holding time in the sintering step is preferably 30 to 180 minutes from the viewpoint of sinterability.

Further, in the sintering step, it is preferable to sinter while pressurizing the molded product. The sintering surface pressure at this time is preferably 1 MPa to 18 MPa from the viewpoint of sinterability.

The sintering step may be performed in air or in an inert gas such as nitrogen gas and argon gas, or may be performed in a reducing gas such as carbon monoxide gas and hydrogen gas, depending on the type of the metal material and the titanate to be a matrix and the type of other raw materials. The sintering step may also be performed in vacuum.

The sintered friction material of the present invention is manufactured by applying a processing such as cutting, grinding, and polishing, to the sintered body obtained through the above steps, if necessary.

Embodiments

The present invention will be specifically described by way of the following Embodiments, but the present invention is not limited thereto.

TEST EXAMPLE 1

EMBODIMENTS 1-1 TO 1-8 AND COMPARATIVE EXAMPLES 1-1 TO 1-4

Raw material having a blending composition (volume %) shown in Table 1 are mixed using a mixer. The obtained mixture of the raw materials is molded by cold pressing at a molding surface pressure of 520 MPa.

Each of the obtained molded products is charged into a graphite mold and sintered by a hot press method to obtain sintered friction materials of Embodiments 1-1 to 1-8 and Comparative Examples 1-1 to 1-4.

The sintering conditions in the hot press method are as follows.
Sintering surface pressure: 3 MPa
Sintering temperature: 950° C.
Sintering holding time: 120 minutes

Friction Performance Evaluation

Regarding the sintered friction materials of Embodiments 1-1 to 1-8 and Comparative Examples 1-1 to 1-4, under the following test conditions, a dynamometer test is performed with reference to Japanese Automotive Standards Organization C406, and a wear amount and an average value of a friction coefficient μ of each sintered friction material are measured. The results are shown in Table 1.

Test Conditions

Effective radius of disc: 250 mm
Friction material area: 15.2 cm²
Cylinder diameter: 40.45 mm
Inertia: 7 kg·m²

Evaluation Method for Wear Amount

The wear amount of the sintered friction material after the completion of the dynamometer test is measured with a micrometer.

Evaluation Method for Friction Coefficient μ

The friction coefficient μ is measured under the following test conditions.
Initial speed: 100 km/h
Pressing pressure: 1.0 MPa to 10.0 MPa (in 1.0 MPa increments)
Number of times: 1 time for each pressing pressure (10 times in total)
Braking disc temperature: 95° C.

The above measurement results are determined based on the following criteria. The results are shown in Table 1.

Wear Amount

○: the wear amount of the sintered friction material is 6.50 mm or less.
×: the wear amount of the sintered friction material is more than 6.50 mm.

Average Value of Friction Coefficient μ

○: the average value of the friction coefficient μ is 0.20 or more.
×: the average value of the friction coefficient μ is less than 0.20.

TABLE 1

(Unit: volume %)

| Raw material | | Embodiment | | | | | | | | Comparative Example | | | |
| --- | --- | --- | --- | --- | --- | --- | --- | --- | --- | --- | --- | --- | --- |
| Type | Name | 1-1 | 1-2 | 1-3 | 1-4 | 1-5 | 1-6 | 1-7 | 1-8 | 1-1 | 1-2 | 1-3 | 1-4 |
| Metal material | Steel fiber | 4.0 | 5.0 | 6.0 | 7.0 | 6.0 | 9.0 | 9.0 | 9.0 | 2.5 | 10.0 | — | 25.0 |
| | Iron powder | 4.0 | 5.5 | 6.0 | 8.0 | 14.0 | 19.0 | 21.0 | 23.0 | 2.5 | 25.0 | — | 35.0 |
| | Tin powder | 2.0 | 2.0 | 2.0 | 2.0 | 2.0 | 2.0 | 2.0 | 2.0 | 2.0 | 2.0 | — | 2.0 |
| Ttanate | Ptassium titanate | 30.0 | 27.5 | 26.0 | 23.0 | 23.0 | 23.0 | 23.0 | 18.0 | 28.0 | 18.0 | 35.0 | — |
| | Lthium potassium titanate | 7.0 | 7.0 | 7.0 | 7.0 | 7.0 | 7.0 | 7.0 | 7.0 | 7.0 | 7.0 | 7.0 | — |
| Abrasive | Chromium oxide | 4.0 | 4.0 | 4.0 | 4.0 | 4.0 | 4.0 | 4.0 | 4.0 | 4.0 | 4.0 | 4.0 | 4.0 |
| Lubricant | Artificial graphite | 45.0 | 45.0 | 45.0 | 45.0 | 40.0 | 35.0 | 30.0 | 33.0 | 50.0 | 30.0 | 50.0 | 30.0 |
| | Natural scaly graphite | 4.0 | 4.0 | 4.0 | 4.0 | 4.0 | 4.0 | 4.0 | 4.0 | 4.0 | 4.0 | 4.0 | 4.0 |
| Metal material | | 10.0 | 12.5 | 14.0 | 17.0 | 22.0 | 30.0 | 32.0 | 34.0 | 7.0 | 37.0 | 0.0 | 62.0 |
| Iron-based material | | 8.0 | 10.5 | 12.0 | 15.0 | 20.0 | 28.0 | 30.0 | 32.0 | 5.0 | 35.0 | 0.0 | 60.0 |
| Friction performance evaluation | Wear amount [mm] | 1.85 | 1.85 | 1.93 | 2.56 | 3.60 | 5.28 | 5.70 | 6.12 | 1.89 | 10.50 | 3.30 | 14.80 |
| | Determination | ○ | ○ | ○ | ○ | ○ | ○ | ○ | ○ | ○ | × | ○ | × |
| | Average value of μ | 0.20 | 0.24 | 0.25 | 0.27 | 0.30 | 0.37 | 0.39 | 0.41 | 0.16 | 0.33 | 0.12 | 0.31 |
| | Determination | ○ | ○ | ○ | ○ | ○ | ○ | ○ | ○ | × | ○ | × | ○ |

As seen from the results in Table 1, the sintered friction materials of Embodiments 1-1 to 1-8 have sufficient friction performance even in a high speed range. The content of the metal material in the sintered friction materials of Comparative Examples 1-1 and 1-2 is outside the scope of the present invention. The sintered friction material of Comparative Example 1-3 does not contain any metal material, and contains only a predetermined amount of titanate as a matrix. The sintered friction material of Comparative Example 1-4 has a metal material content outside the range of the present invention and does not contain any titanate. The sintered friction materials in all Comparative Examples are poor in friction performance compared with the sintered friction materials of Embodiments 1-1 to 1-8.

TEST EXAMPLE 2

Embodiments 2-1 TO 2-9 and Comparative Example 2-1

Raw material having a blending composition (volume %) shown in Table 2 are mixed using a mixer. The obtained mixture of the raw materials is molded by cold pressing at a molding surface pressure of 520 MPa.

Each of the obtained molded products is charged into a graphite mold and sintered by a hot press method to obtain sintered friction materials of Embodiments 2-1 to 2-9 and Comparative Example 2-1.

The sintering conditions in the hot press method are as follows.

Sintering surface pressure: 2 MPa

Sintering temperature: 950° C.

Sintering holding time: 120 minutes

Friction Performance Evaluation

Regarding the sintered friction materials of Embodiments 2-1 to 2-9 and Comparative Example 2-1, a fade test is performed under the following test conditions, and the wear amount of each sintered friction material and a wear amount of a rotor are measured.

The results are shown in Table 2.

Test Conditions

Initial speed: 240 km/h
Final speed: 90 km/h
Deceleration: 8 m/s$^2$
Rotor temperature before the first braking: 120° C.
Number of times of braking: 25 times (19 times in Comparative Example 2-1)
Interval: 30 seconds Evaluation Method for Wear Amount of Sintered Friction Material The wear amount of the sintered friction material after the completion of the fade test is measured with a micrometer and converted into the wear amount per number of times of braking.

Evaluation Method for Wear Amount of Rotor

The wear amount of the rotor after the completion of the fade test is measured with a micrometer and converted into the wear amount per number of times of braking.

TABLE 2

(Unit: volume %)

| Raw material | | Embodiment | | | | | | | | | Comparative Example |
|---|---|---|---|---|---|---|---|---|---|---|---|
| Type | Name | 2-1 | 2-2 | 2-3 | 2-4 | 2-5 | 2-6 | 2-7 | 2-8 | 2-9 | 2-1 |
| Metal material | Steel fiber | 7.0 | 7.0 | 7.0 | 7.0 | 7.0 | 7.0 | 7.0 | 7.0 | 7.0 | 7.0 |
| | Iron powder | 10.0 | 10.0 | 10.0 | 10.0 | 10.0 | 10.0 | 10.0 | 10.0 | 10.0 | 10.0 |
| | Tin powder | 2.0 | 2.0 | 2.0 | 2.0 | 2.0 | 2.0 | 2.0 | 2.0 | 2.0 | 2.0 |
| | Tungsten | 0.0 | 1.0 | 2.0 | 3.0 | 6.0 | 9.0 | 11.0 | 13.0 | 15.0 | 16.0 |
| Titanate | Lithium potassium titanate | 7.0 | 7.0 | 7.0 | 7.0 | 7.0 | 7.0 | 7.0 | 7.0 | 7.0 | 7.0 |
| | Potassium magnesium titanate | 5.5 | 5.5 | 5.5 | 5.5 | 5.5 | 5.5 | 5.5 | 5.5 | 5.5 | 5.5 |
| Abrasive | Zirconium oxide | 1.0 | 1.0 | 1.0 | 1.0 | 1.0 | 1.0 | 1.0 | 1.0 | 1.0 | 1.0 |
| | Silicon carbide | 2.0 | 2.0 | 2.0 | 2.0 | 2.0 | 2.0 | 2.0 | 2.0 | 2.0 | 2.0 |
| Lubricant | Artificial graphite | 62.0 | 61.0 | 60.0 | 59.0 | 56.0 | 53.0 | 51.0 | 49.0 | 47.0 | 46.0 |
| | Molybdenum disulfide | 0.5 | 0.5 | 0.5 | 0.5 | 0.5 | 0.5 | 0.5 | 0.5 | 0.5 | 0.5 |
| | Natural scaly graphite | 3.0 | 3.0 | 3.0 | 3.0 | 3.0 | 3.0 | 3.0 | 3.0 | 3.0 | 3.0 |
| Metal material (total) | | 19.0 | 20.0 | 21.0 | 22.0 | 25.0 | 28.0 | 30.0 | 32.0 | 34.0 | 35.0 |
| Iron-based material (total) | | 17.0 | 17.0 | 17.0 | 17.0 | 17.0 | 17.0 | 17.0 | 17.0 | 17.0 | 17.0 |
| Friction performance evaluation | Wear amount [mm/times] of sintered friction material | 0.32 | 0.24 | 0.17 | 0.11 | 0.02 | 0.06 | 0.11 | 0.18 | 0.28 | 0.43 |
| | Wear amount [mm] of sintered friction material | 7.88 | 6.02 | 4.18 | 2.70 | 0.61 | 1.49 | 2.72 | 4.45 | 7.10 | 8.11 |
| | Times of braking [times] | 25 | 25 | 25 | 25 | 25 | 25 | 25 | 25 | 25 | 19 |
| | Wear amount [μm/time] of rotor | −0.42 | −0.40 | −0.35 | −0.30 | −0.10 | −0.09 | −0.04 | −0.01 | −0.02 | 0.02 |

As seen from the results in Table 2, the sintered friction materials of Embodiments 2-1 to 2-9 have sufficient friction performance even in a high speed range.

Although the present invention has been described in detail with reference to specific embodiments, it will be apparent to those skilled in the art that various modifications and variations are possible without departing from the spirit and scope of the present invention. The present application is based on a Japanese Patent Application (Patent Application No. 2018-205687) filed on Oct. 31, 2018, and a Japanese Patent Application (Patent Application No. 2019-

174044) filed on Sep. 25, 2019, contents of which are incorporated herein by reference.

INDUSTRIAL APPLICABILITY

The sintered friction material of the present invention is a friction material with a low environmental load containing a copper component in a content of a certain amount or less. In addition, the sintered friction material of the present invention has sufficient friction performance even in a high speed range.

The sintered friction material of the present invention can be used for brakes of general transportation equipment such as a passenger vehicle, a commercial vehicle, a motorcycle, and a railway, industrial machines, or the like.

The invention claimed is:

1. A sintered friction material, in which a content of a copper component is 0.5 mass % or less, comprising:
 a titanate and a metal material other than copper, as a matrix, wherein
 a content of the titanate is 8.0 volume % to 60.0 volume %,
 a content of the metal material other than copper is 10.0 volume % to 34.0 volume %,
 the titanate contains a titanate complex, and
 the titanate is in a sintered state.

2. The sintered friction material according to claim 1, wherein
 the titanate further contains at least one salt selected from a group consisting of an alkali metal titanate and an alkaline earth metal titanate.

3. The sintered friction material according to claim 1, wherein
 the titanate further contains at least one salt selected from a group consisting of potassium titanate, sodium titanate, calcium titanate, lithium potassium titanate, and potassium magnesium titanate.

4. The sintered friction material according to claim 1, wherein
 the metal material other than copper contains an iron-based material, and a content of the iron-based material is 8.0 volume % to 32.0 volume %.

5. The sintered friction material according to claim 1, wherein
 the metal material other than copper contains tungsten, and a content of tungsten is 1.0 volume % to 15.0 volume %.

6. A method for manufacturing the sintered friction material according to claim 1, comprising:
 a mixing step of mixing raw materials containing the titanate and the metal material other than copper;
 a molding step of molding the raw materials mixed in the mixing step; and
 a sintering step of sintering, at 900° C. to 1300° C., a molded product molded in the molding step, wherein
 in the sintered friction material, the titanate and the metal material other than copper form the matrix, and a content of the metal material other than copper is 10.0 volume % to 34.0 volume %.

7. The sintered friction material according to claim 4, wherein
 the metal material other than copper further contains tungsten, and a content of tungsten is 1.0 volume % to 15.0 volume %.

8. The sintered friction material according to claim 1, wherein
 the content of the titanate is 12.0 volume % to 55.0 volume %.

9. The sintered friction material according to claim 2, wherein
 the content of the titanate is 12.0 volume % to 55.0 volume %.

10. The sintered friction material according to claim 3, wherein
 the content of the titanate is 12.0 volume % to 55.0 volume %.

11. The sintered friction material according to claim 1, wherein
 the titanate contains potassium titanate and lithium potassium titanate.

12. The sintered friction material according to claim 11, wherein
 the content of the titanate is 25.0 volume % to 37.0 volume %.

13. The sintered friction material according to claim 1, wherein
 the titanate contains lithium potassium titanate and potassium magnesium titanate.

* * * * *